United States Patent [19]
Robinson, Jr.

[11] 3,761,978
[45] Oct. 2, 1973

[54] WATER SAFETY DEVICE FOR OCCUPANTS OF A SUBMERGED VEHICLE
[76] Inventor: Hugh J. Robinson, Jr., 1133 Shades Crest Rd., Birmingham, Ala. 35226
[22] Filed: Oct. 4, 1972
[21] Appl. No.: 294,847

[52] U.S. Cl. .................................................. 9/9
[51] Int. Cl. ............................................. B63c 7/26
[58] Field of Search ................ 9/9, 8 R; 280/150 R; 296/37.2; 110/1 H; 116/124 B

[56] References Cited
UNITED STATES PATENTS
2,823,069   2/1958   Walker ............................ 296/37.2
2,738,524   3/1956   Peay ................................... 9/9
2,820,971   1/1958   Welsh et al. ......................... 9/9
1,860,327   5/1932   Kuhn ................................... 9/9
3,401,413   9/1968   Anselmi ............................... 9/9

Primary Examiner—Milton Buchler
Assistant Examiner—Gregory W. O'Connor
Attorney—Hugh P. Carter et al.

[57] ABSTRACT

A releasable assembly is detachably connected to a spare wheel having a buoyant tire and to the chassis of a vehicle with positive release means for releasing said spare wheel and the assembly carried thereby. A flexible line is carried by the releasable assembly with one end of the line secured to the assembly and the other end thereof anchored to the chassis. Positive release means also releases any trunk lid or cover for the spare wheel. A pouch carrying survival items is also provided.

10 Claims, 7 Drawing Figures

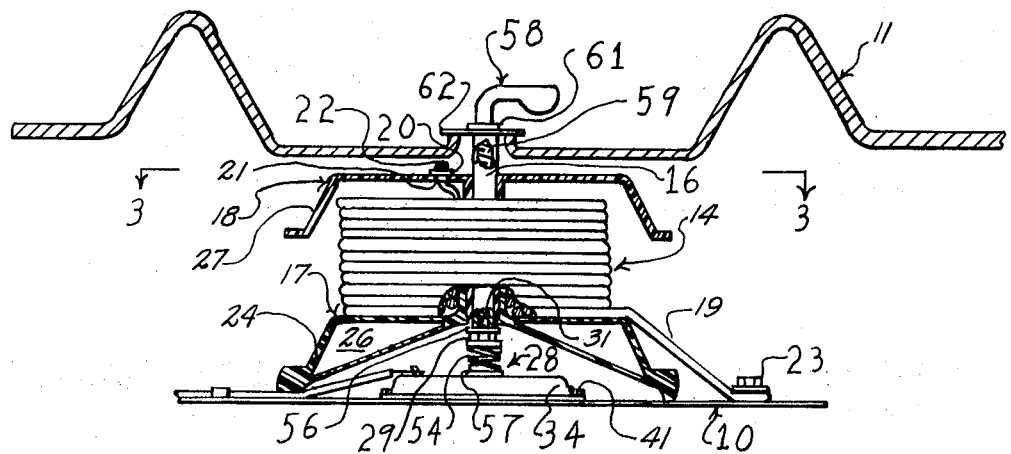
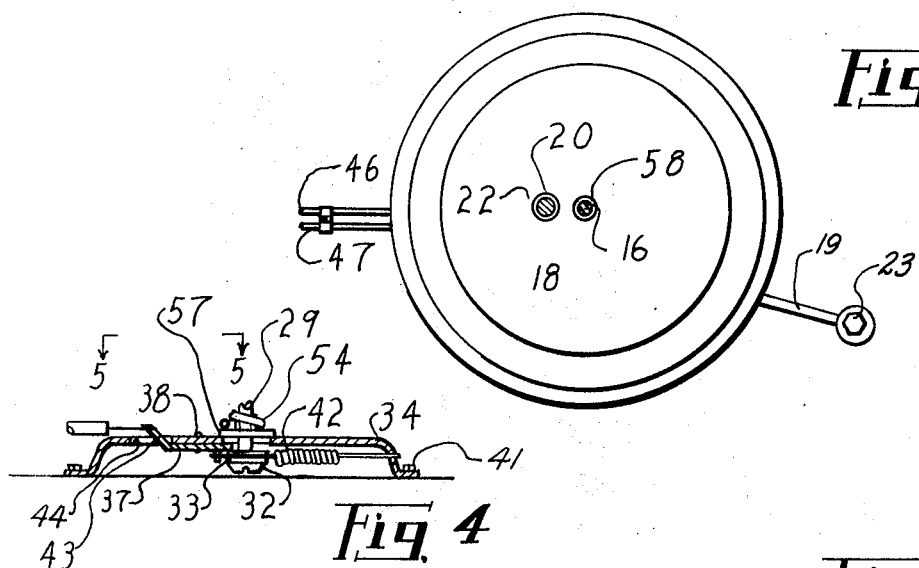
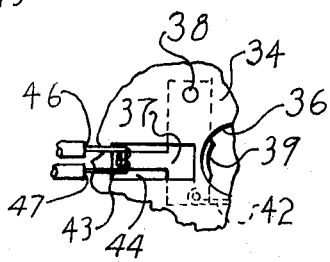
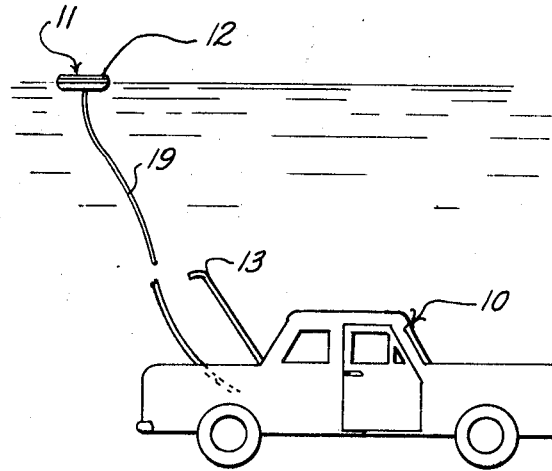

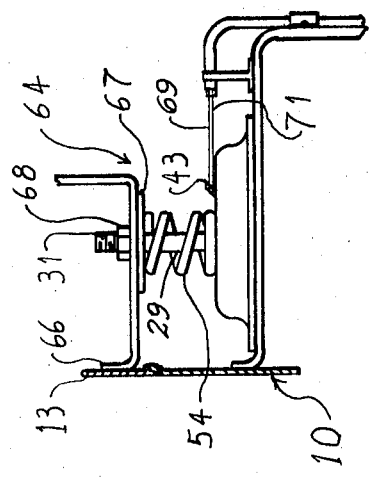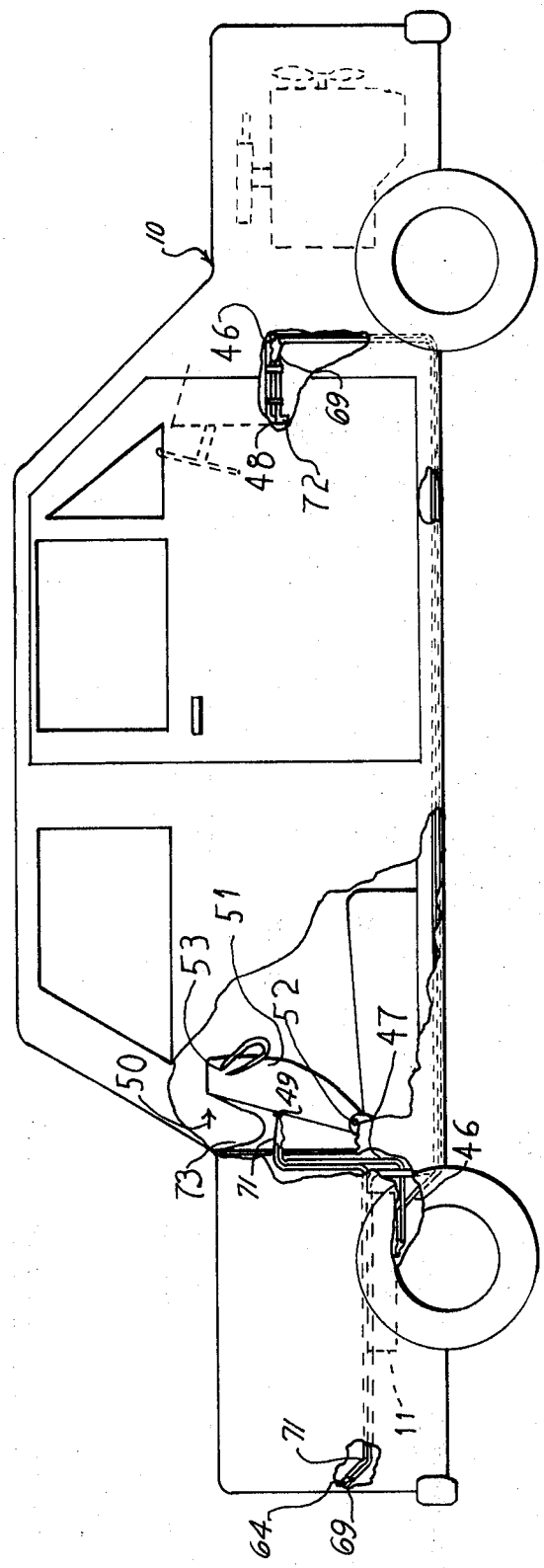

1

WATER SAFETY DEVICE FOR OCCUPANTS OF A SUBMERGED VEHICLE

BACKGROUND OF THE INVENTION

This invention relates to a water safety device for occupants of submerged vehicles and more particularly to a releasable assembly which is detachably connected to a spare wheel and to the vehicle whereby the spare wheel may be removed when desired without affecting operation of the safety device and the safety device may be positivly actuated to release the entire assembly and the spare wheel when the vehicle becomes submerged in water.

As is well known in the art to which my invention relates, when a motorist loses control of an automotive vehicle, and plunges into deep water, most occupants have in the past been trapped and drowned and even the location of their demise unknown to passers by.

BRIEF SUMMARY OF THE INVENTION

In accordance with my invention, I provide an emergency means whereby the occupant or occupants of a submerged vehicle may render aid to themselves by releasing in a positive manner the trunk lid or other cover for a spare wheel and inflated tire and then positively releasing the spare wheel and tire and an assembly carried thereby whereby the spare wheel and inflated tire float to the surface with a flexible line uncoiling therefrom connecting the spare wheel and tire assembly to the vehicle. A releasable latch assembly is interposed between the spare wheel and the vehicle chassis with means detachably connecting the spare wheel to the assembly whereby the spare wheel may be removed when needed without interferring with the emergency unit. Latch means detachably connects the assembly to the chassis of the vehicle and manually operated positive release means is connected to the latch means and extends inwardly of the vehicle in reach of an occupant whereby the latch is released by the occupant. A flexible line is secured at one end to the assembly with the other end thereof anchored to the vehicle whereby the assembly and the spare wheel and inflated tire are free to leave the vehicle with the flexible line extending between the vehicle and the assembly carried by the spare wheel thus marking the location of the vehicle and at the same time serving as a guide line for the occupant of the vehicle whereby he knows which direction is up. The floating spare wheel and inflated tire serves as an object for the occupant to cling to or may serve as a floating base from which to re-submerge in search of missing occupants below the surface or to search the immediate area for lost personal belongings. My improved assembly is detachable from the spare wheel and tire assembly in the event the occupant desires to disconnect the spare wheel from the assembly and swim away from the scene by utilizing the spare wheel and tire assembly as a movable float.

Apparatus embodying features of my invention is illustrated in the accompanying drawings, forming a part of this application, in which:

FIG. 1 is a side elevational view showing a submerged vehicle having my improved apparatus associated therewith;

FIG. 2 is an enlarged, fragmental, sectional view showing my improved assembly mounted between a spare wheel and the vehicle chassis;

FIG. 3 is a sectional view taken generally along the line 3—3 of FIG. 2;

FIG. 4 is an enlarged, fragmental, sectional view showing the releasable latch connecting the spare wheel assembly to the vehicle chassis;

FIG. 5 is an enlarged, fragmental view taken generally along the line 5—5 of FIG. 4, parts being omitted for the sake of clarity;

FIG. 6 is a side elevational view, parts being broken away, showing a vehicle having my improved apparatus associated therewith; and, FIG. 7 is an enlarged, fragmental, sectional view showing the release means for the trunk lid of the vehicle.

Referring now to the drawings for a better understanding of my invention, I show a vehicle 10 having a closed compartment for occupants and a spare wheel 11 carrying a buoyant tire 12. As shown in FIGS. 1 and 6, the spare wheel 11 is usually carried in a trunk compartment having a counter-balanced lid 13 which is adapted to pivot to open position, as shown.

As shown in FIG. 2, a releasable assembly 14 is interposed between the spare wheel 11 and the vehicle 10. The releasable assembly 14 comprises an elongated, cylindrical hub member 16 having internal threads at opposite ends thereof, as shown in FIG. 2. Disc-like head members 17 and 18 preferably formed of plastic-like material are mounted adjacent opposite ends of the hub member 16 to define with the hub member a reel for receiving a flexible line 19. The line 19 is wound on the hub 16 with the inner end of the line extending through a suitable opening 21 provided in the head member 18. A reinforcing collar 20 fits into the opening 21, as shown. The end of the line 19 projecting outwardly of the head 18 and reinforcing collar 20 is provided with an enlarged portion 22, such as by providing a knot therein, whereby the inner end of the line is secured to the head member 18. The outermost or other end of the line 19 extends outwardly from the coil at the bottom of the reel and is secured to the frame of the vehicle 10 by a suitable retaining bolt 23. As shown in FIG. 2, the head 17 is provided with a peripheral flange 24 which extends downwardly and outwardly toward the chassis of the vehicle 10. Preferably, the head 17 is provided with air pockets 26 therein so as to be buoyant. The head 18 is provided with a downwardly and outwardly extending peripheral flange 27 which extends over the line 19 wound on the hub 16 to thus form a cover therefor.

The releasable assembly 14 is detachably connected to the vehicle 10 by latch means indicated generally at 28. The latch means 28 comprises an elongated retractable member 29 having threads 31 at one end thereof for engaging a threaded opening in the adjacent end of the elongated hub member 16 nearest the vehicle, as shown. The elongated retractable member 29 is provided with an enlarged diameter portion 32 which tapers toward the chassis of the vehicle 10, as shown in FIG. 4, to define an annular retractable shoulder 33 which is spaced from the tapered end, as shown. A downwardly opening cup-like member 34 encases the lower portion of the elongated member 29, as shown in FIGS. 2 and 4 and is provided with a centrally disposed opening 36 for receiving the elongated member 29.

A movable latch element 37 is pivotally connected to the cup-like member 34 by a pivot pin 38 and is provided with an arcuate portion 39 which is adapted to move into engagement with the retractable shoulder 33 to thus secure the elongated member 29 to the cup-like member 34 which in turn is secured rigidly to the frame of the vehicle 10 by suitable retaining bolts 41. A tension spring 42 is connected to the end of the latch element 37 opposite the end thereof connected to the pivot member 38 for urging the arcuate portion 39 of the latch element 37 into firm engagement with the retractable shoulder 33 to thus positively secure the elongated member 29 and the assembly 14 carried thereby to the frame of the vehicle 10. The latch element 37 is provided with an upturned portion 43 which projects through a suitable opening 44 provided in the member 34, as shown in FIGS. 4 and 5. Manually operated, positive release means, such as cables 46 and 47 are connected to the upturned portion 43 of the latch element 37. The flexible cables 46 and 47 extend through suitable flexible sheathes whereby the cables are adapted for free sliding movement in the sheathes. Since the use of flexible cables and protective sheathes therefor are well known in the art, no further description thereof is deemed necessary. The flexible cable 46 extends into the closed compartment of the vehicle 10 and preferably terminates in easy reach of the operator of the vehicle in the front glove compartment or console. A suitable actuating handle 48 is secured to the flexible cable 46, as shown in FIG. 6. The flexible cable 47 extends upwardly and is connected as at 49 to the back of a seat cushion frame 51 which is pivotally supported by pivot members 52. The back seat portion 51 is thus adapted to move in the direction of arrow 50 from a vertical position to the manually pulled inward position shown in FIG. 6 to thus pull the cable 47 whereby the latch element 37 is moved out of engagement with the retractable shoulder 33. Suitable assist-strap type manual pull elements 53 are provided at each end of the back seat portion 51 adjacent the upper end thereof whereby the back of the seat may be pulled forward and inwardly from the top with a reasonable deliberate effort.

To assure positive release of the shoulder 33 from the latch element 37, a compression spring 54 is interposed between the hub member 16 and the retractable shoulder 33. Preferably, a washer-like element 56 and a retainer collar 57 are provided at opposite ends of the compression spring 54, as shown with the collar 57 adjacent the retractable shoulder 33. The compression spring 54 thus urges the releasable assembly 14 away from the latch element 37 upon release of the element whereby there is positive separation of the releasable assembly 14 from the vehicle 10 and any casual or inadvertent re-engagement of retractable shoulder 33 with latch element 37 is prevented due to the retractable shoulder 33.

The spare wheel 11 is detachably connected to the assembly 14 by a connector element 58 which is preferably generally L-shaped, as shown in FIG. 2. External threads 59 are provided at one end of the connector member 58 for engaging internal threads carried by the adjacent end of the hub member 16. A collar 61 is secured rigidly to the connector member 58 in position to engage a washer 62 which in turn engages the central portion of the spare wheel 11, as shown. The other leg of the L-shaped member 58 extends laterally and generally parallel to the wheel 11, as shown.

The releasable cover, such as the trunk lid 13 of the vehicle 10 is counter-balanced conventionally and is released by a latch member 64, as shown in FIG. 7. The latch member 64 is identical to the latch member 28 with the exception of the connection of the elongated member 29 to a bracket 66 carried by the trunk lid 13. That is, a suitable opening is provided in the bracket 66 for receiving the elongated member 29 and a collar 67 is secured rigidly to the elongated member 29 in position to engage the under surface of the bracket 66. The threads 31 on the elongated member 29 receive a retaining nut 68 whereby the elongated member 29 is secured rigidly to the trunk lid 13. Flexible cables 69 and 71 are secured to the upstanding member 43 of the latch member 64 with the flexible cable 71 being secured to the seat portion 51 as at 49 whereby the latch member 64 is released upon pulling the seat portion 51 forward, as described hereinabove. The flexible cable 69 extends forwardly of the vehicle and terminates in the closed compartment of the vehicle 10 adjacent the operator thereof. A suitable operating handle 72 is secured to the end of the flexible cable 69 for actuating the same, as shown. In view of the fact that the operation of the latch member 64 is identical to the operation of the latch member 28, no further description thereof is deemed necessary. By providing my improved latch member 64, the exterior key inserted lock in the trunk lid is eliminated entirely thus improving security and convenience.

As shown in FIG. 6, a flexible sheet of material 73 extends in a depending fold between the movable back seat portion 51 and the rear portion of the vehicle 10 in position to define a pouch for supporting survival equipment between the seat and the vehicle. When opened, the pouch positions the survival equipment in easy reach of the occupants of the vehicle. Such survival equipment may be in the form of swim fins, inflatable or solid buoys and the like.

From the foregoing description, the operation of my improved apparatus will be readily understood. The conventional, inflated pneumatic type spare tire is mounted in the usual manner upon a spare wheel 11 and is stored in the trunk compartment, or other compartment for a spare wheel, by inserting the hub 16 through the usual center opening in the spare wheel 11. The washer 62 is then positioned over the central opening in the wheel and the bracket 58 is inserted into the threaded opening in the hub 16. Upon rotating the laterally disposed leg of the member 58, with the thumb and forefinger, the wheel 11 is firmly anchored to the assembly 14. Accordingly, the wheel and tire may be readily removed at any time without disturbing the assembly 14.

The assembly 14 is detachably connected to the vehicle 10 by inserting the tapered portion 32 of the elongated retractable member 29 through the opening 36 in the member 34 whereupon the retractable shoulder 33 passes the latch element 37. The spring 42 then retains the latch element 37 in firm engagement with the retractable shoulder 33 until the latch element 37 is positively released by either of the cables 46 or 47. The spring 54 then forces the shoulder out of the grasp of the latch element 37.

When a vehicle accidentally plunges into deep water, the engine end of the vehicle being heavier will sink earlier. Accordingly, an air bubble is formed within the closed compartment and will linger longer in the rear upper portion of the closed compartment. A conscious and calm occupant of the submerged vehicle is able to aid himself and the safety of the other occupants by manually pulling the emergency release in the front or rear portion of the vehicle. That is, both latch members 28 and 64 are released upon pulling the seat member 51 forwardly. Also, both latch members are released upon pulling the front actuating handles 48 and 72 provided adjacent and in easy reach of the operator of the vehicle. As the rear seat back portion 51 is pulled forwardly and inwardly by the assist-strap loops 53, the fold of the sheet of flexible material 73 defining a pouch between the seat and the vehicle moves upwardly to thus position survival articles positioned therein in easy reach of the occupant of the vehicle.

Upon release of the trunk lid 13 and the assembly 14 carrying the spare tire 11, the assembly 14, including the coiled guideline 19, and the spare wheel 11 move outwardly of the trunk of the vehicle 10 due to the buoyancy of the pneumatic tire 12. As the assembly 14 moves upwardly in the water, the coiled flexible line 19, such as nylon, uncoils from the hub 16 whereby the line 19 extends between the assembly 14 and the vehicle 10 when the assembly 14 and the spare wheel 11 reach the surface of the water. Preferably, the line 19 is of a bright color which may be seen in murkey water whereby a disoriented swimmer can readily determine which direction is up and can follow the guideline to the surface. The line 19 thus defines a guideline which not only aids the swimmer in reaching the surface but also floats thereon and indicates the position of the submerged vehicle. It is very important to provide a line 19 of a bright color and visible in murkey water due to the fact that a disoriented swimmer may swim in circles and in the wrong direction simply because he does not know which way is up. It will thus be seen that an occupant of the submerged vehicle may exit through any available opening and then follow the flexible guide line to the surface and then cling to the floating unit. An adult could thus make several trips up and down the guideline to rescue small children who remain in the vehicle and receive air from the bubble formed in the upper rear portion of the vehicle.

When it is necessary to use the spare wheel 11 and the tire carried thereby as a movable float to move away from the scene, the connector member 58 is removed to release the wheel 11 from the assembly 14 whereupon the assembly 14 would then remain on the surface of the water to indicate the location of the vehicle while the surviving occupants could move away from the scene with the floating wheel and tire to safety. Accordingly, the guideline would serve as a marker to further aid in the location of a sunken vehicle, and to aid in the retrieval thereof, and/or personal belongings near the scene.

From the foregoing, it will be seen that I have devised an improved water safety device. By providing manual pull positive mechanical release means for the trunk lid and the assembly carrying the spare wheel and tire, I assure positive release of the spare wheel from the vehicle each time the release mechanism is acutated. Also, by providing detachable means for connecting the spare wheel to the assembly 14, the conventional spare wheel and pneumatic tire may be easily removed in the usual manner from the vehicle with a minimum of effort and without interfering with the safety equipment thereunder which is detachably connected to the vehicle 10. Furthermore, in the event the release mechanism is accidentally actuated, no loss or damage occurs due to the fact that the wheel 11 and tire 12 do not leave the compartment unless the vehicle is submerged in water. Accordingly, one would merely have to reset the tapered plunger 32 in the opening 36 whereby the latch 37 would re-engage the retractable shoulder 33 to thus positively lock the assembly 14 to the vehicle and then close the trunk lid 13. Furthermore, it will be seen that I have provided a safety device which is extremely simple of construction, economical of manufacture, foolproof and highly efficient in operation.

While I have shown my invention in but one form, it will be obvious to those skilled in the art that it is not so limited, but is susceptible of various other changes and modifications without departing from the spirit thereof.

What I claim is:

1. In a water safety device for occupants of a submerged vehicle having a closed compartment for occupants and a spare wheel carrying a buoyant tire, the improvement comprising:
   a. a releasable assembly interposed between said spare wheel and said vehicle,
   b. means detachably connecting said spare wheel to said assembly,
   c. latch means detachably connecting said assembly to said vehicle,
   d. manually operated positive, retractable release means operatively connected to said latch means and extending inwardly of said vehicle in reach of an occupant thereof, and
   e. a flexible guideline secured at one end to said assembly with the other end thereof anchored to said vehicle so that upon release of said assembly said assembly and said spare wheel are both free to leave said vehicle with said line extending between said vehicle and said assembly.

2. A water safety device as defined in claim 1 in which said releasable assembly is buoyant and comprises:
   a. an elongated hub member for receiving said flexible line, and
   b. a disc-like head adjacent each end of said hub member.

3. A water safety device as defined in claim 2 in which the means detachably connecting said spare wheel to said assembly comprises a threaded connector detachably engaging a threaded opening at the end of said elongated hub member adjacent said spare wheel.

4. A water safety device as defined in claim 3 in which said threaded connector comprises a generally L-shaped member having external threads adjacent one end thereof for engaging said threaded opening and a thumb member adjacent the other end thereof.

5. A water safety device as defined in claim 2 in which said latch means detachably connecting said assembly to said vehicle comprises:
   a. an elongated member having threads adjacent one end thereof for engaging a threaded opening at the end of said elongated hub member nearest said vehicle and having a portion at the other end thereof which tapers toward said other end and defines a retractable shoulder in spaced relation to said other end,
   b. a movable latch element carried by said vehicle and engagable with said retractable shoulder,
   c. resilient means urging said latch element into engagement with said shoulder until released by said manually operated release means, and d. a spring member between said hub and said retractable shoulder and adapted to urge said assembly away from said latch element and said vehicle upon release of said latch element.

6. A water safety device as defined in claim 5 in which said manually operated release means comprises at least one flexible cable-like member connected at one end to said latch element with the other end thereof operatively connected to a control member within said closed compartment.

7. A water safety device as defined in claim 6 in which said other end of at least one cable-like member is connected to a movable seat for said vehicle whereby said latch element is actuated upon moving said seat a predetermined distance.

8. A water safety device as defined in claim 7 in which a flexible sheet extends between said movable seat and said vehicle in position to define a depending pouch for supporting survival equipment between said seat and said vehicle.

9. A water safety device as defined in claim 1 in which a releasable cover for said spare wheel is released by a latch member which is operatively connected by manually operated positive retractable release means extending inwardly of said vehicle in reach of an occupant thereof.

10. A water safety device as defined in claim 9 in which said latch member comprises:
   a. an elongated member connected at one end to said releasable cover and having a portion at the other end thereof which tapers toward said other end and defines a retractable shoulder in spaced relation to said other end,
   b. a latch element carried by said vehicle and engageable with said retractable shoulder,
   c. resilient means urging said latch element into engagement with said retractable shoulder until released by said manually operated release means, and
   d. a spring member between said cover and said retractable shoulder and adapted to positively urge said assembly away from said latch element and said vehicle upon release of said latch element.

* * * * *